(12) United States Patent
Buddenbohm et al.

(10) Patent No.: US 6,351,939 B1
(45) Date of Patent: Mar. 5, 2002

(54) SWIRLING, IMPINGING SHEET INJECTOR

(75) Inventors: Harold William Buddenbohm, Woodland Hills; Li-Keng Tseng, West Hills, both of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/553,815

(22) Filed: Apr. 21, 2000

(51) Int. Cl.[7] .................. B63H 11/00; B64G 9/00; F02K 9/00; F03H 9/00; F23R 9/00
(52) U.S. Cl. ..................................... 60/204
(58) Field of Search ..................... 60/258, 257, 204, 60/39.06, 740, 742

(56) References Cited

U.S. PATENT DOCUMENTS

| | | | |
|---|---|---|---|
| 3,603,092 A | * 9/1971 | Paine | 60/258 |
| 3,780,952 A | * 12/1973 | Huang | 239/424.5 |
| 4,525,175 A | 6/1985 | Stellaccio | |
| 4,801,092 A | 1/1989 | Webber et al. | |
| 4,863,102 A | 9/1989 | Levin | |
| 5,265,415 A | 11/1993 | Cox, Jr. | |
| 5,496,170 A | * 3/1996 | Primdahl et al. | 431/187 |
| 5,603,213 A | 2/1997 | Sion et al. | |
| 5,617,997 A | 4/1997 | Kobayashi et al. | |
| 5,622,046 A | * 4/1997 | Michaels et al. | 60/258 |
| 5,845,846 A | 12/1998 | Watanabe et al. | |

* cited by examiner

Primary Examiner—Charles G. Freay
Assistant Examiner—W. Rodriguez
(74) Attorney, Agent, or Firm—Harness Dickey & Pierce PLC

(57) ABSTRACT

An injector for injecting a first liquid propellant and a second liquid propellant into a combustion chamber of a rocket engine. The injector includes a first injection element for injecting a first portion of the first liquid propellant into the combustion chamber such that the first portion of the first liquid propellant enters the combustion chamber in a first sheet or stream. A second injection element is spaced radially outward from the first injection element and injects a second portion of the first liquid propellant into the combustion chamber such that the second portion of the first liquid propellant enters the combustion chamber in a second stream. The first and second streams collide, causing the first and second portions of the first liquid propellant to at least partially atomize. A third injection element is spaced radially outward from the second injection element and injects at least a first portion of the second liquid propellant into the combustion chamber such that the first portion of the second liquid propellant enters the combustion chamber in a third stream. The third stream is collided with the at least partially atomized first propellant and produces a mixture of an atomized fuel and oxidizer. A method for injecting liquid oxidizer and liquid fuel into a combustion chamber is also provided.

23 Claims, 2 Drawing Sheets

SWIRLING, IMPINGING SHEET INJECTOR

STATEMENT REGARDING FEDERALLY SPONSORED RESEARCH

This invention was made with Government support under Contract Number F33615-95-2-5520 awarded by DOD/Air Force. The government has certain rights in this invention.

TECHNICAL FIELD

The present invention relates generally to propellant injectors for rocket engines and more particularly to a propellant injector which injects propellant in a series of swirled, impinging sheet layers.

BACKGROUND OF THE INVENTION

Discussion

Thrust chambers for liquid propelled rocket engines include three principal components: the combustion chamber where rapid high-temperature combustion takes place; the converging/diverging nozzle where the hot reaction gasses are accelerated to supersonic velocities; and an injector which contains a plurality of injection elements to meter the flow of the propellants at a predetermined rate to achieve a predetermined fuel-to-oxidizer mixture ratio. Injectors are also operable for atomizing and mixing the fuel and oxidizer in the combustion chamber so that combustion will take place in an efficient, stable and homogeneous manner.

Conventional injectors for liquid propellants usually contain a propellant manifold and an injector plate. Injectors having this configuration typically rely on a plurality of small diameter, close tolerance orifices to control the metering, atomizing and mixing of the fuel. While construction of injectors in this manner can provide highly efficient performance, several drawbacks remain.

One drawback in particular relates to the complexity and cost of these injectors. Each of the orifices in these injectors must be precisely controlled to achieve impingement for atomization and mixing. Due to their tight tolerances and small diameter, the holes are also frequently difficult to accurately machine and gage, especially when there many elements are incorporated into the injector plate. Furthermore, the rate with which the injector plate may be machined is typically slow relative to other machining operations due to the high number and precise location of the orifices and the type of material from which the injector plate is fabricated. Lastly, errors in the machining process, such as those associated with an effect known as "wandering" which can occur during the machining of small diameter holes, edge breaks, tooling failures, etc. increase the risk of scrap or the need for rework which must be factored into the cost of the injector plate. As typical injector plates have many of these orifices, frequently in excess of one hundred holes, the manufacture of these injector plates can be extremely costly.

SUMMARY OF THE INVENTION

It is one object of the present invention to provide an injector that injects a liquid oxidizer into a combustion chamber in a plurality of sheets which impinge upon each other to cause the liquid oxidizer to atomize and lose momentum.

It is another object of the present invention to provide an injector that injects a liquid fuel into a combustion chamber in a sheet which impinges upon a stream or sheet of atomized oxidizer to atomize the liquid fuel and mix the fuel and oxidizer.

It is yet another object of the present invention to provide an injector that swirls a liquid oxidizer as it is injected into a combustion chamber to promote the atomization of the liquid oxidizer and increase dwell time in the combustion chamber to improve combustion efficiency.

It is another object of the present invention to provide an injector that swirls a liquid fuel as it is injected into a combustion chamber to promote the atomization and dwell of the liquid fuel.

It is still another object of the present invention to provide an injector that employs a liquid oxidizer to form a thermal barrier at a face of the injector to protect the injector against the heat generated by the combustion of a fuel.

It is yet another object of the present invention to provide an injector that employs a liquid fuel to form a thermal shield of coolant on the combustion chamber wall to prevent hot gases from eroding, melting or otherwise damaging the chamber wall.

It is still another object of the present invention to provide a method for injecting a liquid oxidizer and a liquid fuel into a combustion chamber that utilizes multiple impingement points.

In one preferred form, the present invention provides an injector for injecting a first liquid propellant and a second liquid propellant into a combustion chamber of a rocket engine. The injector includes a first injection element for injecting a first portion of the first liquid propellant into the combustion chamber such that the first portion of the first liquid propellant enters the combustion chamber in a first sheet. A second injection element is spaced radially outward from the first injection element and injects a second portion of the first liquid propellant into the combustion chamber such that the second portion of the first liquid propellant enters the combustion chamber in a second sheet. The first and second sheets collide, causing the first and second portions of the first liquid propellant to at least partially atomize. A third injection element is spaced radially outward from the second injection element and injects at least a first portion of the second liquid propellant into the combustion chamber such that the first portion of the second liquid propellant enters the combustion chamber in a third sheet. The third sheet is collided with the at least partially atomized first propellant and produces a mixture of an atomized fuel and oxidizer. A method for injecting liquid oxidizer and liquid fuel into a combustion chamber that utilizes multiple impingement points is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
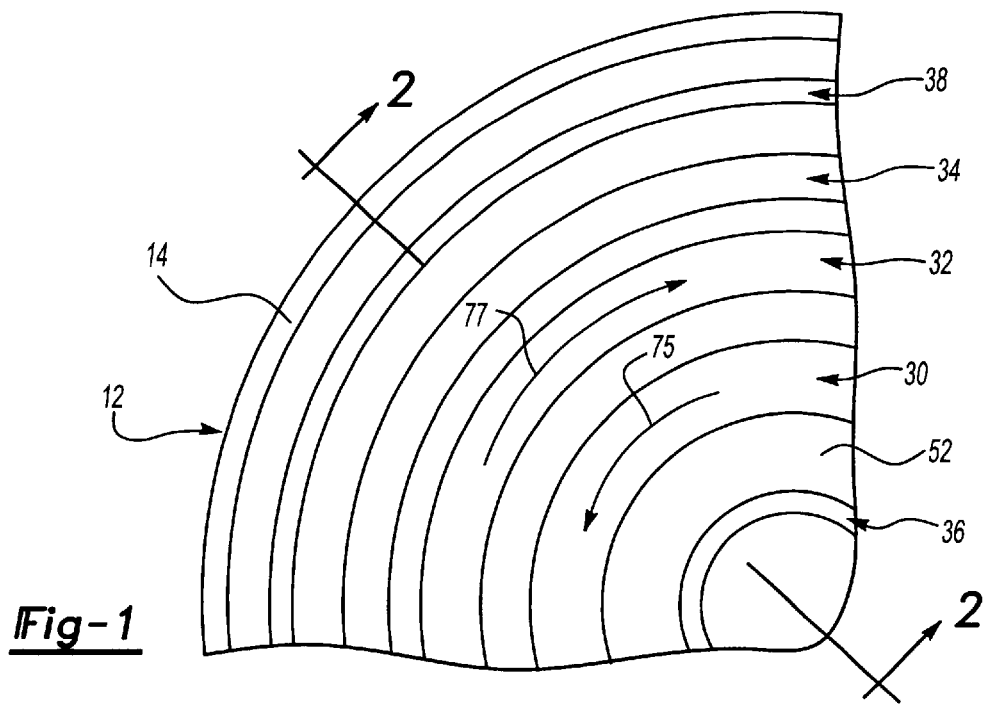
FIG. 1 is a bottom elevational view of a portion of a rocket engine constructed in accordance with the teachings of the present invention.
Figure 2:
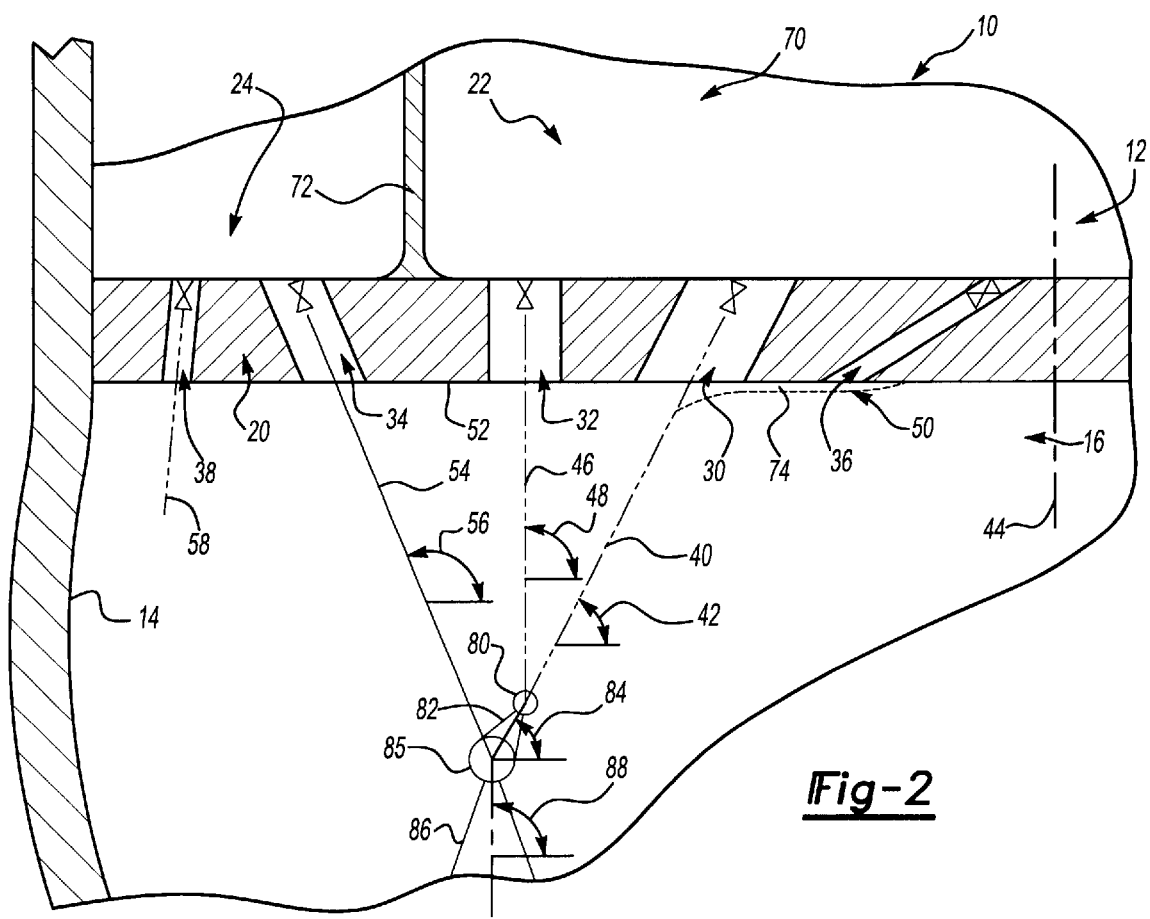
FIG. 2 is a schematic cross-sectional view of a portion of the rocket engine of FIG. 1 taken along the line 2—2.

With reference to FIGS. 1 and 2 of the drawings, a rocket engine constructed in accordance with the teachings of the present invention is generally indicated by reference numeral 10. Rocket engine 10 is shown to include an injector 12 and a chamber wall 14 which cooperate to define a combustion chamber 16. Injector 12 includes an injection plate 20, a first liquid propellant plenum 22 and a second liquid propellant plenum 24 separated by an interpropellant boundary 72. In the particular embodiment illustrated, the first liquid propellant is a liquid oxidizer and the second liquid propellant is a liquid fuel. However, those skilled in the art will understand that the configuration of injector 12 will vary depending upon the types of propellant that are employed.

Injection plate 20 is shown to be cylindrical in shape but those skilled in the art will understand that other configurations are possible, such as a linear configuration, and that these other configurations may be desirable in some situations. Injection plate 20 includes first and second liquid oxidizer injection elements 30 and 32, respectively, and a liquid fuel injection element 34. In the particular embodiment illustrated, injection plate 20 is also shown to include a third liquid oxidizer injection element 36 and a boundary layer coolant injection element 38. First liquid oxidizer injection element 30 is an annular injection element operable for injecting a first portion of a liquid oxidizer into combustion chamber 16. First liquid oxidizer injection element 30 is adapted to inject the first portion of the liquid oxidizer in a first sheet 40 having a first angle 42 relative to a line normal to a centerline 44 of combustion chamber 16. As those skilled in the art will understand, the first liquid oxidizer injection element 30 injects the first portion over a line, as opposed to the prior art injectors that dispense propellant at a plurality of discrete points. Accordingly, the first portion of the liquid oxidizer is dispensed into the combustion chamber 16 in a sheet or plane, instead of in a line as in the case of the injectors of the prior art.

Second liquid oxidizer injection element 32 is an annular injection element operable for injecting a second portion of the liquid oxidizer into combustion chamber 16. Second liquid oxidizer injection element 32 is spaced radially outward from first liquid oxidizer injection element 30 and is adapted to inject the second portion of the liquid oxidizer in a second sheet 46 having a second angle 48 relative to a line normal to the centerline 44 of combustion chamber 16. As with the first liquid oxidizer injection element 30, those skilled in the art will understand that the second liquid oxidizer injection element 32 injects the second portion of the liquid oxidizer into the combustion chamber 16 over a line to thereby produce a sheet or plane of liquid oxidizer.

Third liquid oxidizer injection element 36 is an annular injection element operable for injecting a third portion of the liquid oxidizer into combustion chamber 16. Third liquid oxidizer injection element 36 is spaced radially inward from first liquid oxidizer injection element 30 and is adapted to inject the third portion of the liquid oxidizer to form a thermal barrier 50 proximate an injection face 52 of injector plate 20.

Liquid fuel injection element 34 is an annular injection element operable for injecting at least a first portion of the liquid fuel into combustion chamber 16. Liquid fuel injection element 34 is spaced radially outward of the second liquid oxidizer injection element 32 and is adapted to inject the first portion of the liquid fuel in a third sheet 54 having a third angle 56 relative to a line normal to the centerline 44 of combustion chamber 16. As with the first liquid oxidizer injection element 30, those skilled in the art will understand that the liquid fuel injection element 34 injects the first portion of the liquid fuel into the combustion chamber 16 over a line to thereby produce a sheet or plane of liquid oxidizer.

Coolant injection element 38 is a series of circumferentially-spaced feed holes that are operable for injecting a second portion of the liquid fuel into combustion chamber 16. Coolant injection element 38 is spaced radially outward of liquid fuel injection element 34 and is adapted to inject the second portion of the liquid fuel in a series of streams 58. The series of streams 58 are positioned adjacent to chamber wall 14 and operably insulates chamber wall 14 from heat generated during combustion of the fuel and oxidizer propellants.

Liquid oxidizer is supplied to first, second and third liquid oxidizer injection elements 30, 32 and 36, via first liquid propellant plenum 22. First liquid propellant plenum 22 is shown to be generally cylindrical in construction with a hollow center 70 for delivering the liquid oxidizer and an inner propellant boundary 72 for separating it from the second liquid propellant at the injection plate 20. Liquid fuel is supplied to liquid fuel injection element 34 and coolant injection element 38 via second liquid propellant plenum 24. Second liquid propellant plenum 24 is shown to have a generally semi-circular shape and is centered about first liquid propellant plenum 22.

In operation, liquid oxidizer is delivered to combustion chamber 16 primarily through first and second liquid oxidizer injection elements 30 and 32. In the embodiment illustrated, the first and second streams 40 and 46 delivered by the first and second liquid oxidizer injection elements 30 and 32 are frusto-conical in shape.

Third liquid oxidizer injection element 36 delivers only a small portion of the total liquid oxidizer supplied to the combustion chamber 16 and causes a liquid oxidizer film 74 to form near the injection face 52 of the injector 12 to provide a thermal barrier 50 which protects the injection plate 20 from the heat produced by the combustion of the liquid fuel.

First and second liquid oxidizer injection elements 30 and 32 preferably swirl the first and second portions of the liquid oxidizer, respectively, as they are injected into combustion chamber 16. In this regard, the first and second liquid oxidizer injection elements 30 and 32 impart a swirl component to the first and second sheets 40 and 46, respectively, that tends to direct the sheets 40 and 46 in predetermined directions which tend to promote mixing of the first and second sheets 40 and 46 rather than their impingement on one another. To increase momentum transfer for improved atomization, the first and second portions of the liquid oxidizer are preferably swirled in opposite circumferential directions. In the particular embodiment illustrated, the first and third portions of the liquid oxidizer are swirled in the same direction (i.e., a first circumferential direction designated by the arrow 75 in FIG. 1) while the second portion of the liquid oxidizer is swirled in an opposite direction (i.e., a second circumferential direction designated by the arrow 77 in FIG. 1). The magnitude of the radial momentum of the first and third portions of the liquid oxidizer is approximately equal to the magnitude of the radial momentum of the second portion of the liquid oxidizer. Consequently, the total radial momentum of the first, second and third portions of the liquid oxidizer is zero.

The first and second streams 40 and 46 collide at a first impingement point 80, causing the first and second portions of the liquid oxidizer to at least partially atomize and produce an atomized oxidizer stream 82 having a low total momentum that travels along a first resultant angle 84. As the radial momentum of the first and third portions of the liquid oxidizer is approximately equal and oppositely directed to the radial momentum of the second portion of the liquid oxidizer, the radial momentum of the first, second and third portions of the liquid oxidizer is consumed in the collision between the first and second streams 40 and 46 to enhance the atomization of the liquid oxidizer. The first, second and third liquid oxidizer injection elements 30, 32 and 36, respectively, are arranged such that the first resultant angle 84 is appropriate for the desired momentum balance with the fuel propellant. In the particular embodiment illustrated, the first resultant angle 84 is about 60 degrees relative to a line normal to the centerline of the combustion chamber.

In the embodiment illustrated, the third stream 54 delivered by the liquid fuel injection element 34 is frusto-conical in shape and is swirled in one of the first and second radial directions as it is delivered to combustion chamber 16. In this regard, injection element 34 imparts a swirl component to the third stream 54 that tends to direct the third streams 54 in a predetermined direction which tend to promote the mixing of the third stream 54 and the atomized oxidizer stream 82 rather than their impingement on one another.

Preferably, the first portion of the liquid fuel is swirled with a magnitude to achieve desired momentum balance with the oxidizer and desired mixed flowstream direction. In the particular embodiment illustrated, the liquid fuel is swirled with a magnitude approximately 2.5 times the radial momentum of either the first or second portion of the liquid oxidizer. The third stream 54 is oriented to collide with the atomized oxidizer stream 82 at a second impingement point 85 to produce a mixture of atomized fuel and oxidizer 86 that travels along a second resultant angle 88. The momentum flux of the atomized oxidizer stream 82 and the first portion of the liquid fuel are controlled so that a circulating flow is established to perform the forced mixing between the fuel and oxidizer. Preferably, the mixture of atomized fuel and oxidizer 86 has a total momentum that is directed inward toward the centerline 44 of the combustion chamber 16 to avoid hot gas blanching the chamber wall 14.

Figure 3:
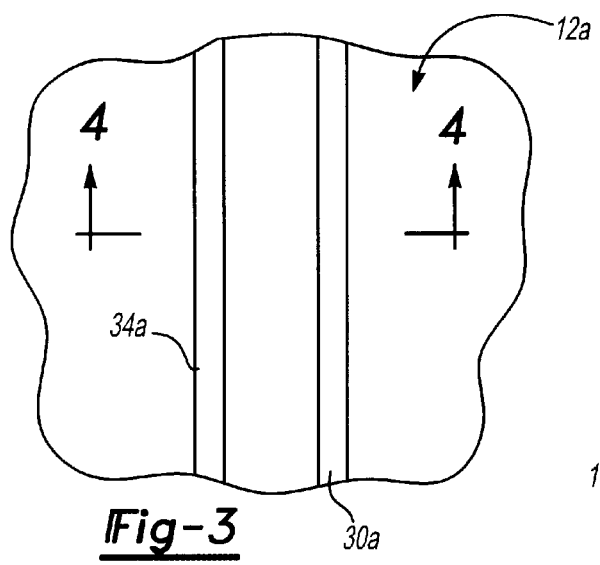
FIG. 3 is a bottom elevational view of a portion of a rocket engine constructed in accordance with a first alternate embodiment of the present invention.
Figure 4:
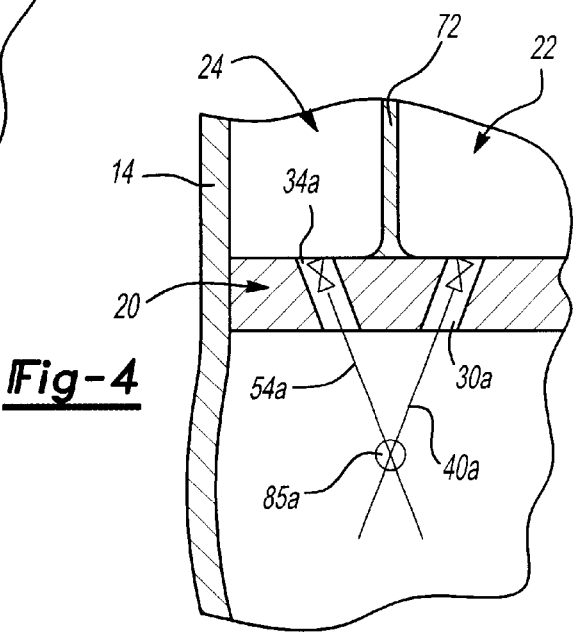
FIG. 4 is a schematic cross-sectional of the rocket engine of FIG. 3 taken along the line 4—4.

While the rocket engine 10 has been described thus far as having a plurality of circular injection elements which utilize two impingement points for mixing and atomizing two liquid propellants, those skilled in the art will appreciate that the invention, in its broader aspects, may be constructed somewhat differently. For example, the rocket engine may be constructed with linear injection elements as shown in FIGS. 3 and 4.

In this arrangement, the injector 12a includes a first injection element 30a for injecting first stream 40a of a first liquid propellant and a second injection element 34a for injecting a second stream 54a of a second liquid propellant. The first injection element 30a directs the first stream 40a outwardly toward the second steam 54a. The first injection element 30a also imparts a swirl component to the first stream 40a which is axially directed in a first direction generally parallel the first injection element 30a. The second injection element 34a similarly directs the second stream 54a inwardly toward the first stream 40a and imparts a swirl component to the second stream 54a which is axially directed in a second direction generally parallel the second injection element 34a and opposite the first direction. As discussed above, the imparting of a swirl component onto one or more of the streams is undertaken to promote the mixing of the streams. The first and second streams 40a and 54a impinge at an impingement point 85a and then mix.

Figure 5:
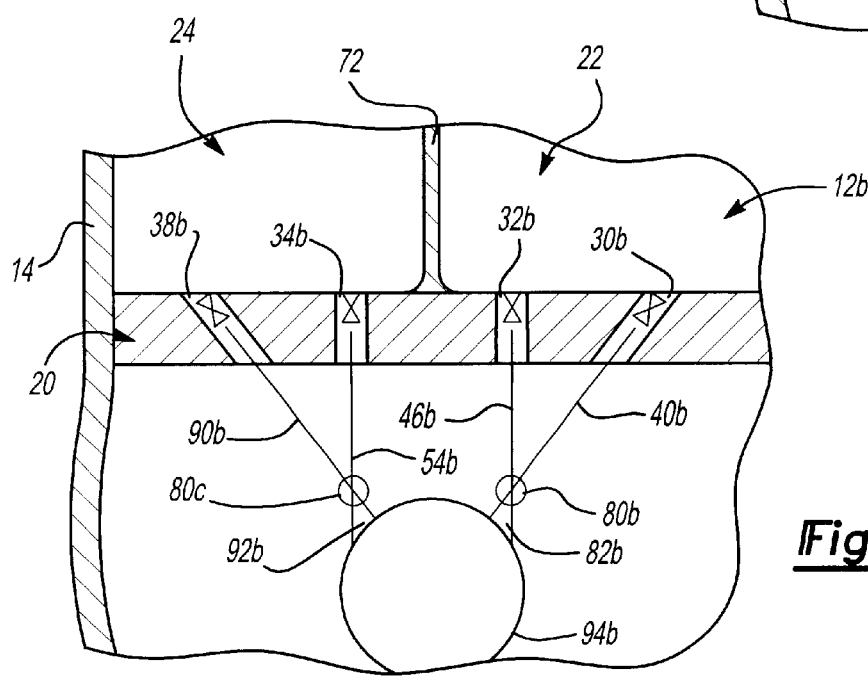
FIG. 5 is a schematic cross-sectional view similar to FIG. 2 but illustrating a rocket engine constructed in accordance with a second alternate embodiment of the present invention.

A second alternate embodiment is illustrated in FIG. 5 wherein the injector 12b includes first and second injection elements 30b and 32b for injecting a first liquid propellant in first and second streams 40b and 46b and third and fourth injection elements 34b and 38b for injecting a second liquid propellant in third and fourth streams 54b and 90b. First and second injection elements 30b and 32b are similar to first and second injection elements 30 and 32 in that they direct the first and second streams 40b and 46b to impinge on one another and impart a swirl component to each stream 40b and 46b to promote the mixing of the streams 40b and 46b. Upon impingement at impingement point 80b, the first liquid propellant in the first and second streams 40b and 46b at least partially atomizes and produces a first atomized propellant stream 82b having radially outwardly directed momentum.

Similarly, third and fourth injection elements 34b and 38b are arranged to direct the third and fourth streams 54b and 90b to impinge on one another and impart a swirl component to each stream 54b and 90b to promote the mixing of the streams 54b and 90b. Upon impingement at impingement point 80c, the second liquid propellant in the third and fourth streams 54b and 90b at least partially atomizes and produces a second atomized propellant stream 92b having radially inwardly directed momentum. The first and second atomized propellant streams 82b and 92b impinge upon one another at impingement point 94b.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method for injecting a liquid fuel and a liquid oxidizer into a combustion chamber of a rocket engine, the method comprising the steps of:

injecting a first portion of the liquid oxidizer into the combustion chamber in a sheet shaped first stream;

injecting a second portion of the liquid oxidizer into the combustion chamber in a sheet shaped second stream;

colliding the first and second streams at a first impingement point to at least partially atomize the first and second portions of the liquid oxidizer and produce an atomized oxidizer having a low total momentum and a first resultant angle;

injecting at least a portion of the liquid fuel into the combustion chamber in a sheet shaped third stream; and colliding the atomized oxidizer with the third stream at a second impingement point to produce a mixture of atomized fuel and oxidizer having a second resultant angle.

2. The method of claim 1, wherein the first portion of the liquid oxidizer is swirled in a first circumferential direction as it is injected into the combustion chamber and the second portion of the liquid oxidizer is swirled in a second circumferential direction opposite the first circumferential direction as it is injected into the combustion chamber.

3. The method of claim 2, further comprising the step of injecting a third portion of the liquid oxidizer into the combustion chamber to form a thermal barrier proximate an injection face of the injector.

4. The method of claim 3, wherein the total circumferential momentum of the first, second and third portions of the liquid oxidizer is zero.

5. The method of claim 1, further comprising the step of injecting a second portion of the liquid fuel into the combustion chamber proximate a wall of the combustion chamber to insulate the wall from heat generated during combustion of the mixture of atomized fuel and oxidizer.

6. The method of claim 1, wherein the first portion of the liquid fuel is swirled in one of the first and second circumferential directions as it is injected into the combustion chamber.

7. The method of claim 1, wherein the mixture of atomized fuel and oxidizer has a total momentum that is directed inward toward the centerline of the combustion chamber to prevent impingement on a wall of the combustion chamber.

8. The method of claim 1, wherein each of the first, second and third streams are frusto-conical in shape.

9. An injector for mixing a first liquid propellant and a second liquid propellant inside a combustion chamber, the injector comprising:
a circumferentially extending first injection element for injecting a first portion of the first liquid propellant into the combustion chamber of a rocket engine, the first injection element adapted to inject the first portion of the first liquid propellant in a circumferentially extending first stream having a first angle relative to a centerline of the combustion chamber;
a circumferentially extending second injection element for injecting a second portion of the first liquid propellant into the combustion chamber, the second injection element spaced radially outward from the first injection element and adapted to inject the second portion of the first liquid propellant in a circumferentially extending second stream having a second angle relative to the centerline of the combustion chamber, the second stream colliding with the first stream at a first impingement point to at least partially atomize the first and second portions of the first liquid propellant and produce an atomized first propellant with a low total momentum that travels along a first resultant angle; and
a circumferentially extending third fuel injection element for injecting the at least first portion of the second liquid propellant into the combustion chamber, the third injection element spaced radially outward of the second injection element and adapted to inject the first portion of the second liquid propellant in a circumferentially extending third stream having a third angle relative to the centerline of the combustion chamber, the third stream colliding with the atomized first propellant and producing a mixture of an atomized fuel and oxidizer that travels along a second resultant angle.

10. The injector of claim 9, wherein the first injection element is configured such that the first resultant angle comprises an angle of about 60 degrees.

11. The injector of claim 9, wherein the first injection element is configured to swirl the first portion of the first liquid propellant in a first circumferential direction and the second injection element is configured to swirl the second portion of the first liquid propellant in a second circumferential direction opposite the first circumferential direction.

12. The injector of claim 11, further comprising a fourth injection element for injecting a third portion of the first liquid propellant into the combustion chamber, the fourth injection element spaced radially inward from the first injection element and adapted to inject the third portion of the first liquid propellant to form a thermal barrier proximate an injection face of the injector.

13. The injector of claim 12, wherein the first, second and fourth injection elements are configured to balance the circumferential momentum of the first liquid propellant.

14. The injector of claim 11, wherein the third injection element is configured to swirl the first portion of the second liquid propellant in one of the first and second circumferential directions.

15. The injector of claim 9, wherein the first, second and third injection elements are configured to produce a mixture of atomized fuel and oxidizer having a total momentum that is directed inward toward the centerline of the combustion chamber to prevent impingement on a wall of the combustion chamber.

16. The injector of claim 9, wherein each of the first, second and third injection elements are configured to produce a stream that is frusto-conical in shape.

17. An injector for mixing a first liquid propellant and a second liquid propellant inside a combustion chamber, the injector comprising:
a circumferentially extending first injection element for injecting at least a first portion of the first liquid propellant into the combustion chamber of a rocket engine, the first injection element operable for injecting at least the first portion of the first liquid propellant in a circumferentially extending first stream having a swirl component that is directed in a first predetermined circumferential direction; and
a circumferentially extending second injection element for injecting at least a first portion of the second liquid propellant into the combustion chamber of the rocket engine, the second injection element operable for injecting at least the first portion of the second liquid propellant in a circumferentially extending second stream;
wherein the swirl component of the first stream promotes mixing of the first and second streams but does not cause impingement of the first and second streams.

18. The injector of claim 17, wherein the second injection element is further operable for imparting a swirl component to the second stream that is directed in a second predetermined circumferential direction opposite the first predetermined circumferential direction.

19. The injector of claim 18, further comprising a circumferentially extending third injection element for injecting a second portion of the second liquid propellant into the combustion chamber of the rocket engine, the third injection element operable for injecting the second portion of the second liquid propellant in a circumferentially extending third stream that impinges on the second stream.

20. The injector of claim 19, wherein the third injection element is further operable for imparting a swirl component to the third stream that is directed in the first predetermined circumferential direction.

21. A method for injecting a liquid fuel and a liquid oxidizer into a combustion chamber of a rocket engine, the method comprising the steps of:

injecting at least a first portion of the liquid oxidizer into the combustion chamber in a first sheet;

injecting at least a portion of the liquid fuel into the combustion chamber in a second sheet; and colliding the first and second sheets at a fuel-oxidizer impingement point to produce a mixture of atomized fuel and oxidizer.

22. The method of claim 21, wherein the step of injecting at least a first portion of the liquid oxidizer includes the steps of:

injecting the first portion of the liquid oxidizer into the combustion chamber in a first oxidizer sheet;

injecting a second portion of the liquid oxidizer into the combustion chamber in a second oxidizer sheet;

colliding the first and second oxidizer sheets at an oxidizer-oxidizer impingement point upstream of the fuel-oxidizer impingement point to at least partially atomize the first and second portions of the liquid oxidizer.

23. The method of claim 22, wherein the first portion of the liquid oxidizer is swirled in a first circumferential direction as it is injected into the combustion chamber and the second portion of the liquid oxidizer is swirled in a second circumferential direction opposite the first circumferential direction as it is injected into the combustion chamber.

* * * * *

UNITED STATES PATENT AND TRADEMARK OFFICE
CERTIFICATE OF CORRECTION

PATENT NO. : 6,351,939 B1
DATED : March 5, 2002
INVENTOR(S) : Harold William Buddenbohm and Li-Keng Tseng It is certified that error appears in the above-identified patent and that said Letters Patent is hereby corrected as shown below:

Column 5,
Line 20, "stream" should be -- sheet --
Line 25, "stream" (first occurrence) should be -- sheet --
Line 25, "streams" (second occurrence) should be -- sheet --
Line 27, "stream" should be -- sheet --
Line 35, "stream" should be -- sheet --
Line 47, "circular" should be -- annular --
Lines 57, 58, 59 and 61, "stream" should be -- sheet --
Lines 63, 64 and 65, "stream" should be -- sheet --

Column 6,
Line 3, "streams" (first occurrence) should be -- sheet --
Line 3, "streams" (second occurrence) should be -- sheet --
Lines 10 and 13, "streams" should be -- sheet --
Lines 14, 19 and 24, "stream" should be -- sheet --
Line 15, "streams" should be -- sheet --
Lines 17 and 22, "streams" should be -- sheets --
Lines 25, 27 and 30, "streams" should be -- sheets --
Line 28, "stream" should be -- sheets --

Signed and Sealed this

Seventh Day of January, 2003

JAMES E. ROGAN
*Director of the United States Patent and Trademark Office*